(12) United States Patent
Hoeptner, III

(10) Patent No.: US 7,971,598 B1
(45) Date of Patent: Jul. 5, 2011

(54) VALVE IN-LINE BACKFLOW CONTROL

(76) Inventor: Herbert W. Hoeptner, III, Gilroy, CA (US)

(*) Notice: Subject to any disclaimer, the term of this patent is extended or adjusted under 35 U.S.C. 154(b) by 533 days.

(21) Appl. No.: 11/704,854

(22) Filed: Feb. 12, 2007

(51) Int. Cl.
*F16K 24/00* (2006.01)
(52) U.S. Cl. ........................................ 137/217
(58) Field of Classification Search ................ 137/215, 137/216, 217, 218; 251/318, 331
See application file for complete search history.

(56) References Cited

U.S. PATENT DOCUMENTS

| | | | | |
|---|---|---|---|---|
| 2,394,911 | A * | 2/1946 | Griswold | 137/217 |
| 4,893,644 | A * | 1/1990 | Giacomini | 137/218 |
| 6,761,183 | B1 | 7/2004 | Hoeptner, III | |
| 6,776,182 | B2 * | 8/2004 | Ishitoya et al. | 137/202 |

* cited by examiner

*Primary Examiner* — Craig M Schneider
(74) *Attorney, Agent, or Firm* — William W. Haefliger

(57) ABSTRACT

A valving assembly, comprises elongated tubular body, a first annular diaphragm in the body, and a first annular seat in the body engaged by the first diaphragm when pressurized fluid flow passes through the body and through the first diaphragm to deflect the first diaphragm, a second annular diaphragm in the body, and a second annular seat in the body engaged by the second diaphragm when said pressurized flow passes through the body and second diaphragm to deflect the second diaphragm, a third seat in the body engaged by the first diaphragm to block reverse flow through the body, an escape port in the body to allow escape of the reverse flow, and a drain port in the body to allow drainage of such fluid in the body upstream of the first diaphragm during such reverse flow.

5 Claims, 4 Drawing Sheets

VALVE IN-LINE BACKFLOW CONTROL

BACKGROUND OF THE INVENTION

This invention relates generally to valves usable to deliver water from housing or building plumbing lines. More particularly, it concerns improvements to such valves, simplifying their construction, and enhancing their performance.

There is need in such valves for improvements associated with blocking or checking back flow where reverse flow pressure may build-up. Also, there is need in such valves for disposing of build-up back flow pressure, as during checking or blocking of such back flow to the building plumbing. Such back flow, if unchecked, could contaminate water in that plumbing.

U.S. Pat. No. 5,752,542 to Hoeptner discloses an improved valve constructed to meet the above needs. That valve incorporates the following:

a) an outer tubular member having a first flow port, b) an inner member having closure means thereon to close the port in relatively axially advanced position of the inner member, and to open the port in relatively axially retracted position of the inner member, c) control means to control relative movement of the inner member between those positions, d) an axially movable check valve positioned about the axis of the inner member to pass fluid flow from the port and to drain flow space defined between the members, and to block reverse fluid flow from that space and through the first port, in the inner member relatively retracted position, and e) a second port to pass fluid from that space in relatively retracted position of the inner member, thereby to relieve pressure of the fluid in the space.

There is further need to control pressurized fluid for escape from the interior of the valve at times when the check valve is positioned to block reverse fluid flow as referred to, and at other times to block such escape.

SUMMARY OF THE INVENTION

It is a major object of the invention to provide an improved, compact, simple, highly effective valve assembly meeting the above need. Basically, the assembly comprises:

a) an elongated tubular body b) a first annular diaphragm in the body, and a first annular seat in the body engaged by the first diaphragm when pressurized fluid flow passes through the body and through the first diaphragm to deflect the first diaphragm, c) a second annular diaphragm in the body, and a second annular seat in the body engaged by the second diaphragm when such pressurized flow passes through the body and second diaphragm to deflect the second diaphragm, d) a third seat in the body engaged by the first diaphragm to block reverse flow through the body, and an escape port in the body to allow escape of the reverse flow, e) and a drain port in the body to allow drainage of such fluid in the body upstream of the first diaphragm during said reverse flow.

A further object is to provide an annular diaphragm of improved, annularly thickened configuration, obviating need for a compression spring and a stopper.

A yet further object includes provision of a back siphonage controlling check valve assembly of improved construction connected in series with a body side outlet; and in which the additional check valve assembly may have a side discharge port via which fluid can escape under excess pressure conditions.

These and other objects and advantages of the invention, as well as the details of an illustrative embodiment, will be more fully understood from the following specification and drawings, in which:

DRAWING DESCRIPTION

DETAILED DESCRIPTION

Figure 1:
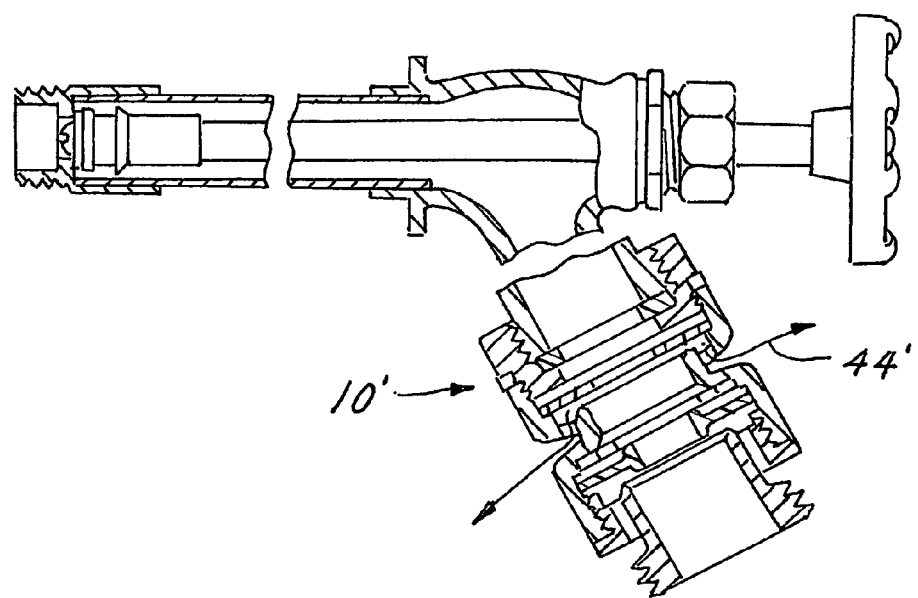
FIG. 1 is an external elevation taken in section and showing a valve assembly incorporating the invention.

In the drawings, an outer tubular member as at 10 has a first flow port 11 at one end of the member. A female fitting 12 at that end is adapted to receive a male pipe end 13 (see FIG. 2) to which water pressure is communicated at 13a typically at about 60 psi. When a control means such as valve handle 14 is rotated in one direction, a closure means such as a valve stopper or plug 15 is backed away from a seat 15a in member 10, allowing pressurized water to flow past in bore 17, and then to flow via space 18 to fitting 10', as for delivering water from plumbing in a residence. See FIG. 3. A flange 20 on the member 10 is engageable with a wall 21 of the building, to position member 10 in a bore in that wall.

The closure assembly 15b is carried by an elongated inner member 24, which in its leftward advanced position, of FIG. 1 is urged against the seat. In rightward retracted position of FIG. 3 the member 15 is spaced from the port 11 to open the latter.

Figure 2:
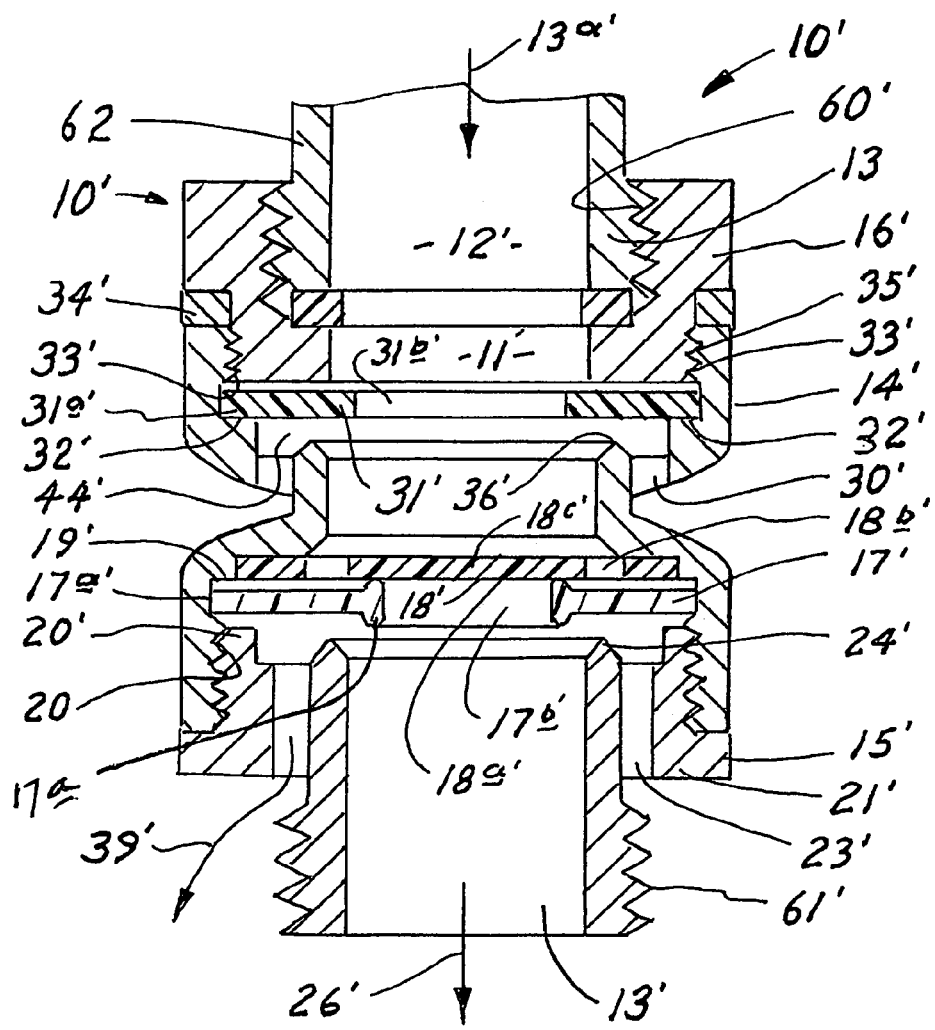
FIG. 2 is a vertical elevation taken through fluid flow control structure.
Figure 3:
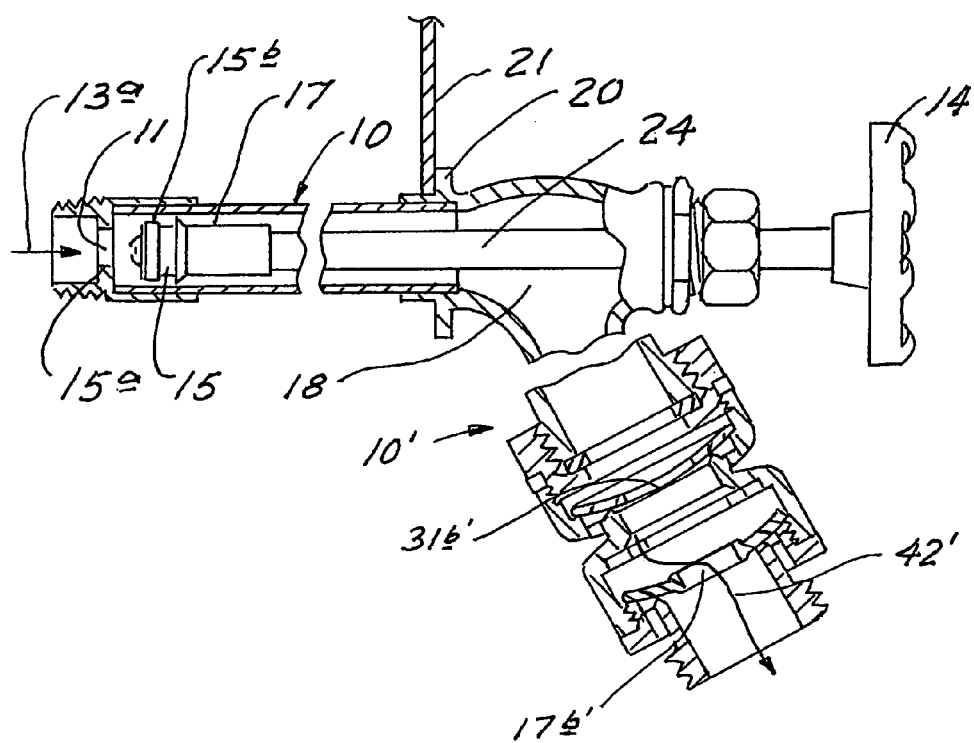
FIG. 3 is section like FIG. 1 showing the valve assembly in ON condition.

In FIGS. 1, 2 and 3 a tubular body means 10' has main through passage structure 11' between entrance and exit ports 12' and 13'. The direction of forward fluid flow is indicated by arrow 13a'. By way of example, the tubular body means may advantageously comprise a first tubular section 14', a second tubular section 15' and a third tubular section 16'; and such sections may be assembled in telescopic relation, as in the manner shown. A first flexible diaphragm 17' is carried by the body means to be exposed to flow in the passage means. As shown, the first diaphragm is annular and may have its outer annular extent 17a' retained between annular shoulder 19' formed by the first body section 14' and annular shoulder 20' as formed by the thread 20. Thread 20 may interconnect 14' and 15'.

Body means 10' also forms a first side port or ports 23' as for example in the flange 21', that port 23' adapted to communicate with the main passage structure in the tubular body prior to diaphragm flexing; however, when the diaphragm is flexed forwardly, as shown, in FIG. 3 it blocks exit flow of fluid from the main passage structure through the first side port or ports 23'. Note that the second body section 15' has an annular tapered seat 24' thereon presented toward the diaphragm and positioned to annularly seat the first diaphragm as it flexes to block exit flow of fluid through the first side port or ports. Under these conditions, flow passes through the diaphragm central opening 17b', and then outwardly through the exit port 13'. See arrow 26'.

The body means also has a second side port or ports 30' for communicating with the interior passage structure 11', as shown in FIG. 2. Under these conditions, the port or ports 30' act as a drain to discharge any remaining fluid above the level of the ports 30', assuming the device is generally vertically oriented, as shown. A second diaphragm 31' moves, i.e. flexes, to block exit flow through the second side port or ports 30' in response to the described forward flow of fluid through the main passage means, this condition being shown in FIG. 3. Note that the second diaphragm outer annular extent 31a' may be captivated between opposed shoulders 32' on the first body section and 33' on the third body section in such manner as to allow the described flexing or movement of the second diaphragm. Seal 34' between shoulders of the sections 14' and 16' limits closure of shoulders 32' and 33' to captivate the second diaphragm. Threading 35' removably connects 14' and 16'.

The first body section 14' is provided with an annular seat 36' facing toward the second diaphragm to seat the latter annularly when it is displaced downwardly, as shown, in response to flow through the device for closing or blocking exit flow of fluid through the second side port or ports 30'.

In accordance with an important aspect of operation, a seat 18' cooperates with the first diaphragm 17' to block back flow of fluid through the main passage means when the first diaphragm moves upwardly to unblock exiting of back flow of fluid through the first side port 23'. See the exit flow arrow 39' in FIG. 2. In this regard, a metallic disc 18a' or equivalent support is provided in the body means to extend horizontally, i.e., normal to the flow, and to seat the first diaphragm 17' as it moves upwardly to unblock exit flow of fluid through the first side port 23'. The central portion 18c' of the disc then extends across the diaphragm central opening 17b' to block the escape of fluid through that opening and the diaphragm blocks escape of fluid through that opening. When the diaphragm is displaced downwardly, as in FIG. 3, flow passes through the disc opening or openings 18b' spaced radially outwardly of, or about, the disc central portion. See flow arrow 42' in FIG. 3. Note also that the second annular diaphragm 31' has a central opening 31b' to pass such flow downwardly, in FIG. 3.

In FIG. 2, the second diaphragm 31' is shown as having moved upwardly off the seat 36' to allow drainage flow of fluid through the second side port or ports 30', as indicated by flow arrow 44' in FIG. 1.

Further features include the following: the two diaphragms are spaced apart lengthwise of the passage means so that they may flex independently. Each of the diaphragms is annular and has its outer periphery retained in fixed position relative to the body means, the latter having disconnectible sections to provide ready access to the diaphragms for removal and replacement.

The invention requires no spring or stopper carried by a spring to seal against diaphragm 17', that diaphragm being thickened at 17a, about opening 17b' as shown, to provide stability and controlled flexure resistance. It allows forward flow of fluid without sideward discharge, ports 23' and 30' being sealed, as clearly shown in FIG. 3. In the event of attempted back flow, the FIG. 2 configuration is assumed and such back flow is discharged at 39'; and any remnant fluid above diaphragm 17' is sidewardly discharged, as indicated by arrow 44'. The position of the elements at rest when there is no back flow are shown in FIG. 2. Threaded connections may be provided internally at 60' for connection to upper ducting 62 and may be provided externally at 61' for connection to lower ducting.

Figure 4:
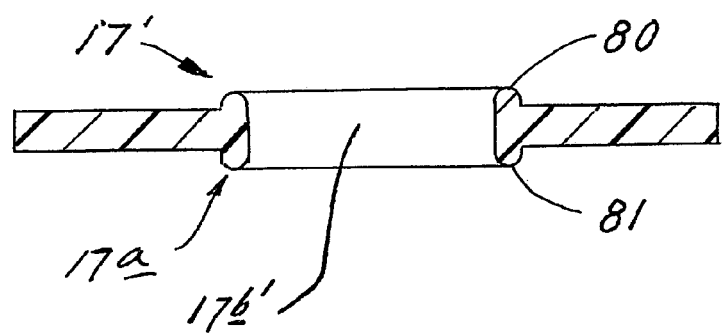
FIG. 4 is an enlarged view showing the improved locally thickened diaphragm seen in FIGS. 1-3.

As also shown in FIG. 4, the diaphragm 17' has generally uniform thickness radially outwardly of an axially thickened annulus adjacent a central opening through the diaphragm. The thickened annulus defines a first annular land 80 projecting outwardly and axially from one side of the diaphragm, and a second annular land 81 projecting outwardly and axially from the opposite side of the diaphragm. The diaphragm consists of an elastomer and said thickened annulus has an axial dimension between 1.5 and 3.0 times the thickness of the diaphragm main extent radially outwardly of said annulus. The diaphragm has generally uniform thickness radially outwardly of an axially thickened annulus adjacent a central opening 17b' through the diaphragm.

I claim:

1. In a valving assembly, the combination comprising
   a) an elongated tubular body
   b) a first annular diaphragm in the body,
   and a first annular seat in the body engaged by the first diaphragm when pressurized fluid flow passes through the body and through the first diaphragm to deflect the first diaphragm,
   c) a second annular diaphragm in the body, and a second annular seat in the body engaged by the second diaphragm when said pressurized flow passes through the body and second diaphragm to deflect the second diaphragm,
   d) a third seat in the body engaged by the first diaphragm to block reverse flow through the body, and an escape port in the body to allow escape of reverse flow,
   e) and a drain port in the body to allow drainage of said fluid in the body upstream of the first diaphragm during said reverse flow,
   f) the first diaphragm having generally uniform thickness defining an annular disc radially outwardly of said axially thickened annulus adjacent a central opening through the diaphragm, said disc having upper and lower planar surfaces,
   g) said thickened annulus defining a first land projecting outwardly and axially from one side of the diaphragm, and a second land projecting outwardly and axially from the opposite side of the diaphragm, said lands projecting above and below said disc planar surfaces,
   h) and wherein the first diaphragm consists of an elastomer and said thickened annulus has an axial dimension between 1.5 and 3.0 times the thickness of the diaphragm main extent radially outwardly of said annulus,
   i) said body engaging radially outward extent of the first diaphragm to effect diaphragm axial flexing into dish-shaped bowed configuration, and the third seat overlying said thickened annulus to be engaged thereby,
   j) the radial extent of the first diaphragm radially outwardly of the thickened annulus being everywhere axially spaced from the body, at the third seat side of the diaphragm.

2. The combination of claim 1 wherein the first and second lands project substantially equal distances above and below said disc planar surfaces.

3. The combination of claim 2 wherein the first and second lands have substantially equal radial thicknesses.

4. The combination of claim 2 wherein the two lands have convexly projecting annular terminals.

5. The combination of claim 2 wherein the two lands have radial thicknesses which are everywhere less than the thickness of the annular disc.

* * * * *